United States Patent
Kwon et al.

(10) Patent No.: US 10,034,239 B2
(45) Date of Patent: Jul. 24, 2018

(54) METHOD AND APPARATUS FOR FORMING CONNECTION BETWEEN DEVICES USING BLUETOOTH LOW ENERGY TECHNOLOGY

(71) Applicant: LG ELECTRONICS INC., Seoul (KR)

(72) Inventors: Younghwan Kwon, Seoul (KR); Jingu Choi, Seoul (KR); Minsoo Lee, Seoul (KR); Hyeonjae Lee, Seoul (KR); Jangwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/319,632

(22) PCT Filed: Jun. 17, 2015

(86) PCT No.: PCT/KR2015/006138
§ 371 (c)(1),
(2) Date: Dec. 16, 2016

(87) PCT Pub. No.: WO2015/194854
PCT Pub. Date: Dec. 23, 2015

(65) Prior Publication Data
US 2017/0325161 A1 Nov. 9, 2017

Related U.S. Application Data

(60) Provisional application No. 62/013,497, filed on Jun. 17, 2014.

(51) Int. Cl.
*H04B 7/00* (2006.01)
*H04W 52/02* (2009.01)
(Continued)

(52) U.S. Cl.
CPC ...... *H04W 52/0209* (2013.01); *H04B 10/516* (2013.01); *H04W 4/008* (2013.01);
(Continued)

(58) Field of Classification Search
CPC ......... H04W 52/0209; H04W 52/0212; H04W 52/0229; H04W 4/008; H04W 8/005; H04W 76/02; H04B 10/516
(Continued)

(56) References Cited

U.S. PATENT DOCUMENTS

2010/0317289 A1 12/2010 Desai et al.
2013/0260690 A1 10/2013 Cha
(Continued)

FOREIGN PATENT DOCUMENTS

KR 10-2014-0072443 A 6/2014

OTHER PUBLICATIONS

Sandhya et al., "Analysis of Bluetooth threats and v4.0 security features", International Conference on Computing, Communication and Applications (ICCCA) 2012, IEEE, Feb. 22-24, 2012, pp. 7.

*Primary Examiner* — Lee Nguyen
(74) *Attorney, Agent, or Firm* — Birch, Stewart, Kolasch & Birch, LLP

(57) ABSTRACT

Disclosed are a method and apparatus for forming a connection between devices using a Bluetooth low energy (BLE) technology. The method for forming a connection between a first device and a second device using BLE includes receiving an advertising message including information related to a pairing control service from the first device, establishing a Bluetooth connection with the first device based on the advertising message, transmitting a first write request message requesting writing of connection request information indicating transmission of a connection request message to the second device included in pairing
(Continued)

control point information through Bluetooth, and receiving a first indication message including connection state information indicating a state of a connection with the second device from the first device, wherein the pairing control point indicates information instructing the first device to perform a specific operation.

14 Claims, 16 Drawing Sheets

(51) Int. Cl.
*H04W 4/00* (2018.01)
*H04W 76/02* (2009.01)
*H04W 8/00* (2009.01)
*H04B 10/516* (2013.01)
*H04W 76/10* (2018.01)
*H04W 4/80* (2018.01)
*H04B 1/00* (2006.01)

(52) U.S. Cl.
CPC .............. *H04W 4/80* (2018.02); *H04W 8/005* (2013.01); *H04W 52/0212* (2013.01); *H04W 52/0229* (2013.01); *H04W 76/02* (2013.01); *H04W 76/10* (2018.02)

(58) Field of Classification Search
USPC .............................................. 455/41.2–41.3
See application file for complete search history.

(56) References Cited

U.S. PATENT DOCUMENTS

| 2014/0086125 | A1 | 3/2014 | Polo et al. |
| 2014/0179233 | A1 | 6/2014 | Kang et al. |
| 2017/0208639 | A1* | 7/2017 | Lee .................... H04W 76/023 |

* cited by examiner

[Fig.1]
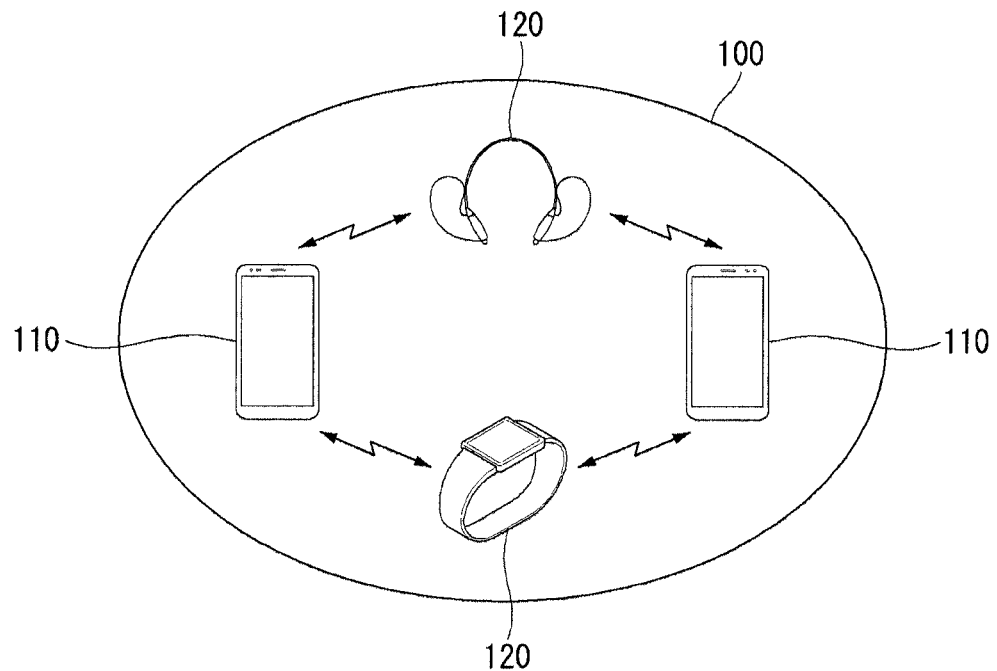

[Fig.2]
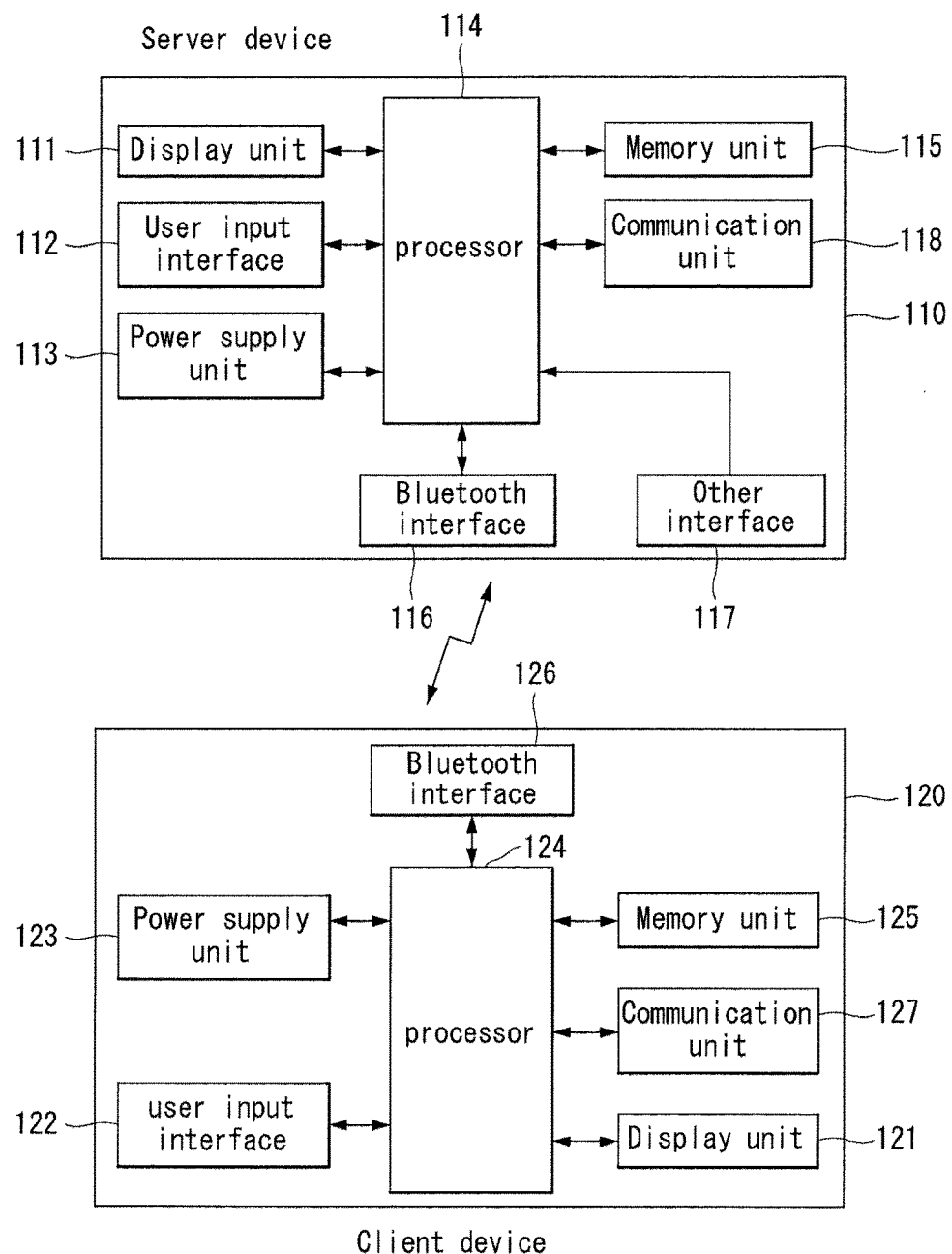

[Fig.3]
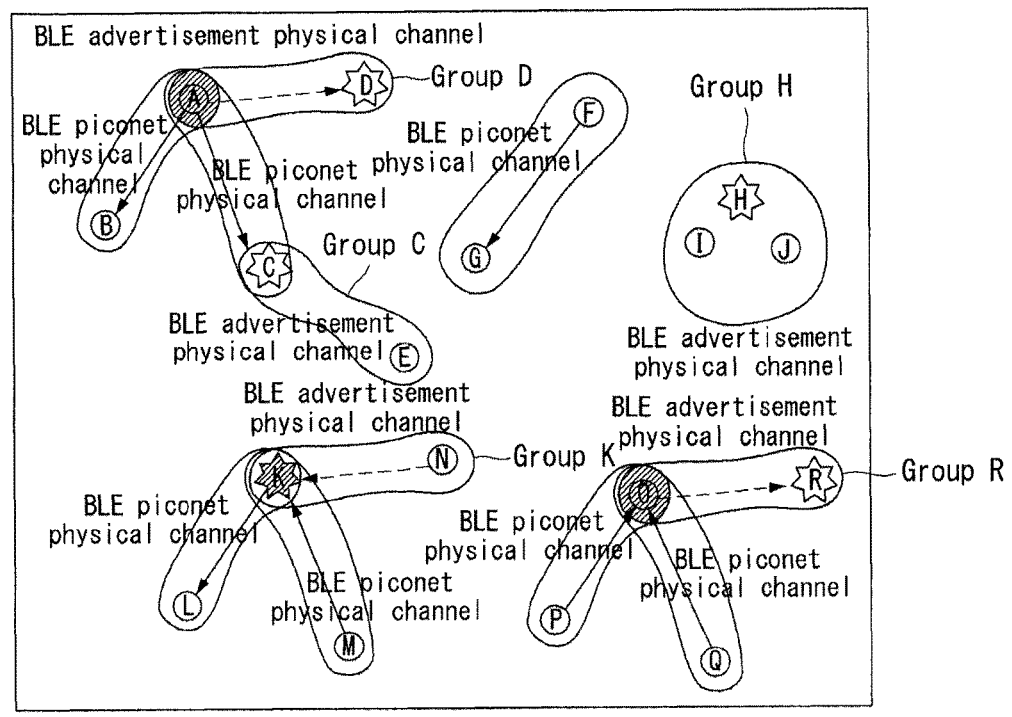

[Fig. 4]
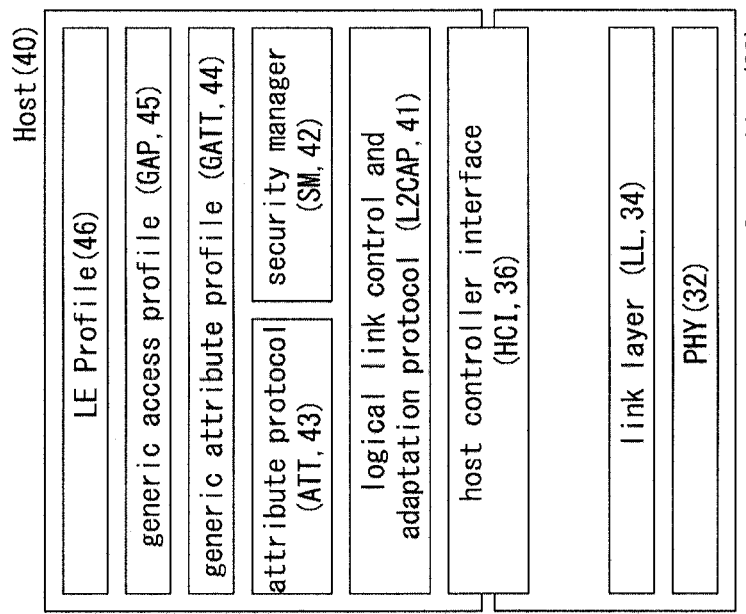
(b) LE Protocol Stack
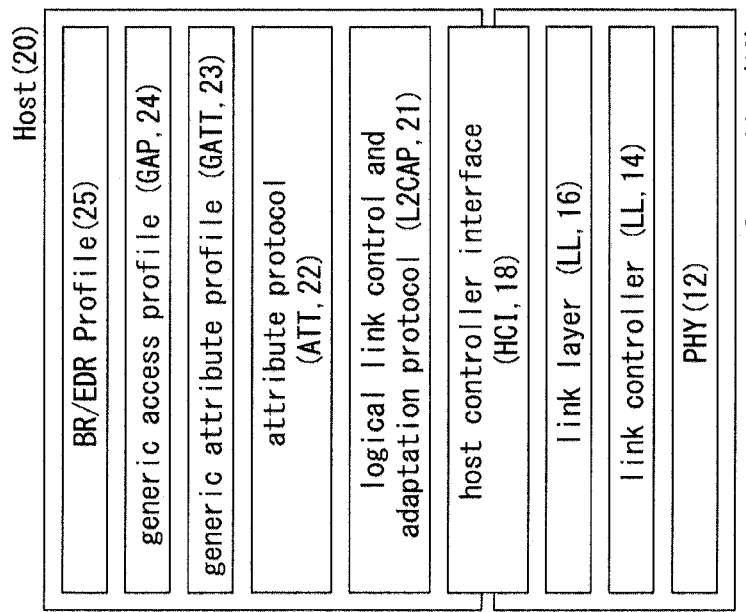
(a) BR/EDR Protocol Stack

[Fig.5]
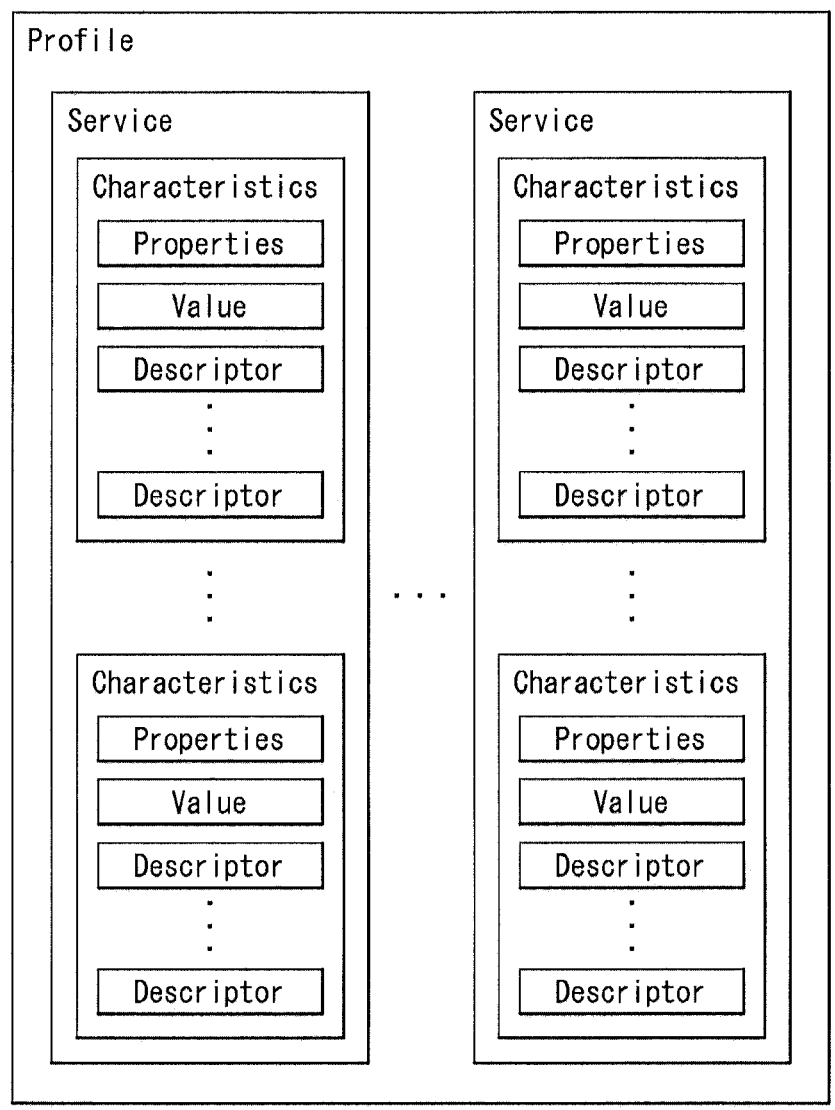

[Fig.6]
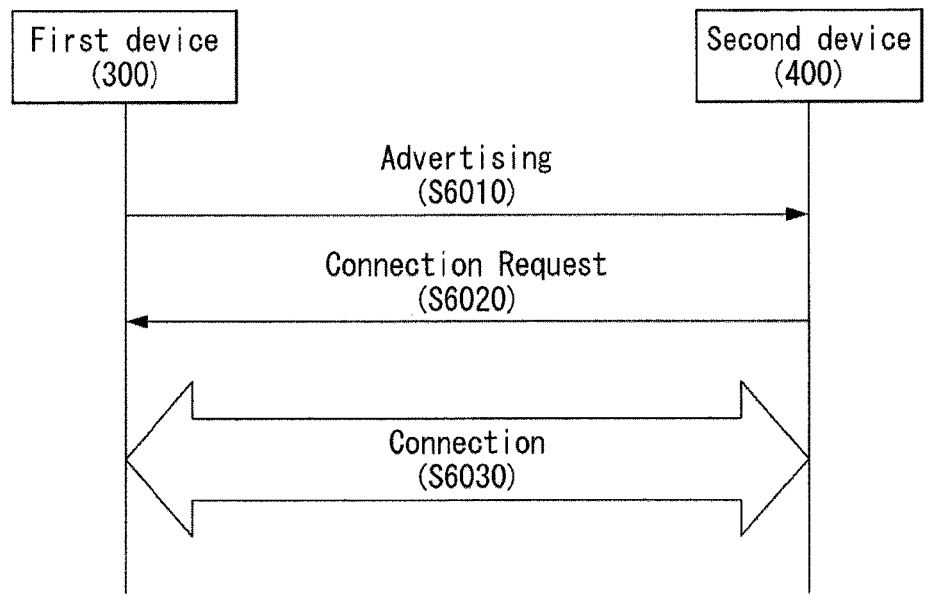

[Fig.7]
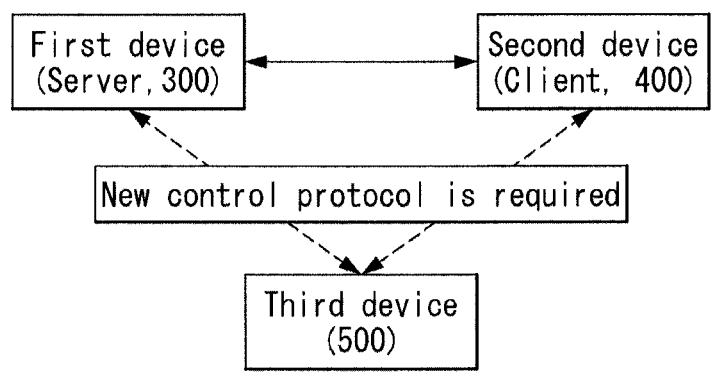

[Fig.8]

| Current Device State | Peer Device (option) | Connected Tech Type | Service Type | Security | Group Info |
|---|---|---|---|---|---|
| 8 bits integer | BT Address (48 bits) or BT Friendly Name (String) | Technology used for connection (BLE, BR/EDR, WiFi, etc.) | service type used in connection (BT service or application service (application) etc.) | security state of present connection (authentication etc.) | Group ID, Group owner etc. |

[Fig. 9]

| Information | Group ID | Group Name | Group Owner | Group Security Level | Group Security Key |
|---|---|---|---|---|---|
| Data Definition | Bluetooth Group Address | Group Friendly Name | OwnerID | Security Modeor Level | Group authenticated Key |
| Description | BT address for identifying specific group in BT network, for which public address or random address is utilized (privacy function can be provided by utilizing resolvable address if necessary) | Group name for identifying specific group, which is defined by group owner | ID of device or person that manages specific group, who is owner of management of group (privacy function can be provided by utilizing resolvable address if necessary) | Security level applied to BT group, which refers to security level applied to core spec | Security key value for joining corresponding BT group (without corresponding key value, it may be impossible to join corresponding group) |
| Data Type | integer | string | integer | Bit information | Integer |

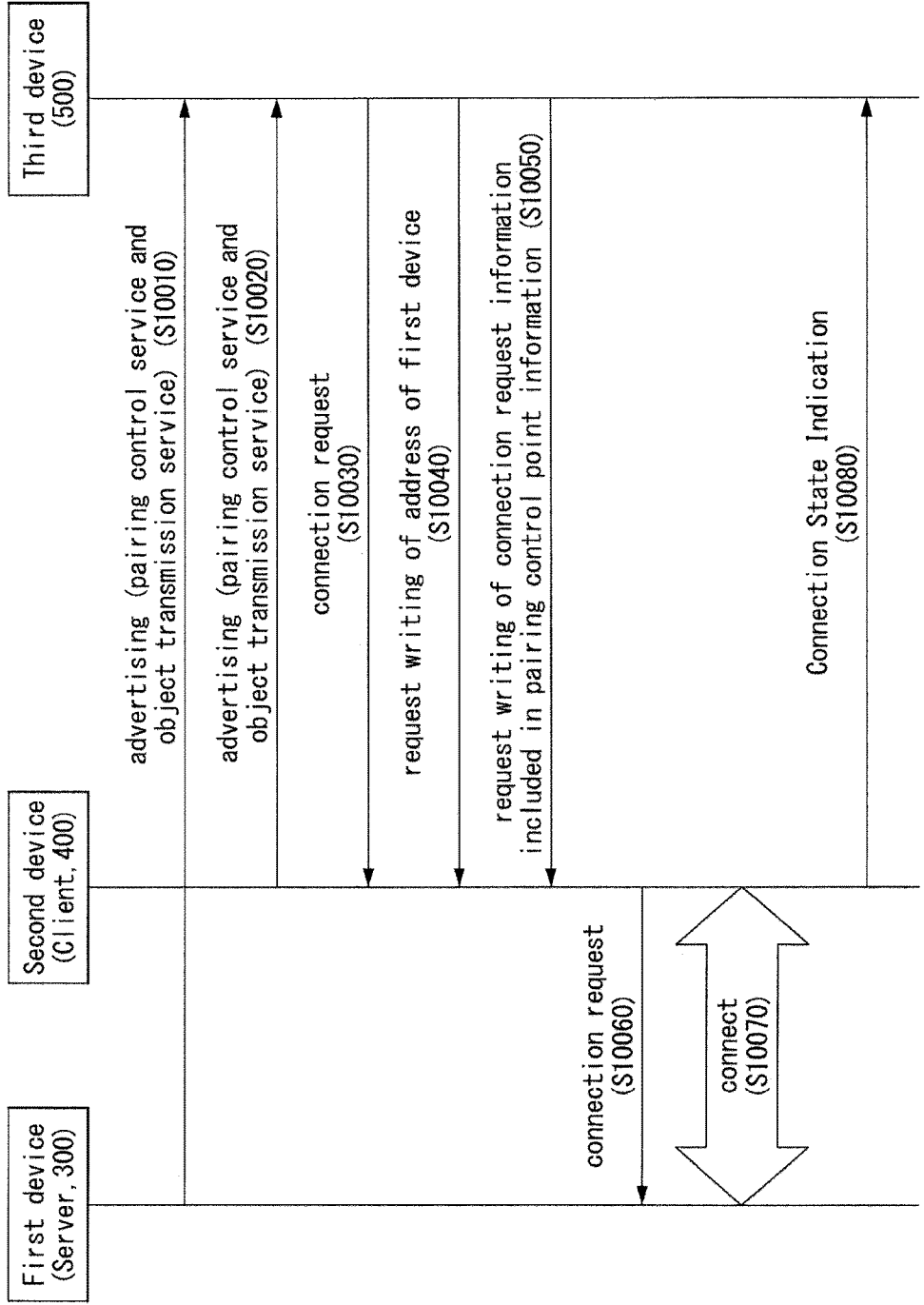
[Fig.10]

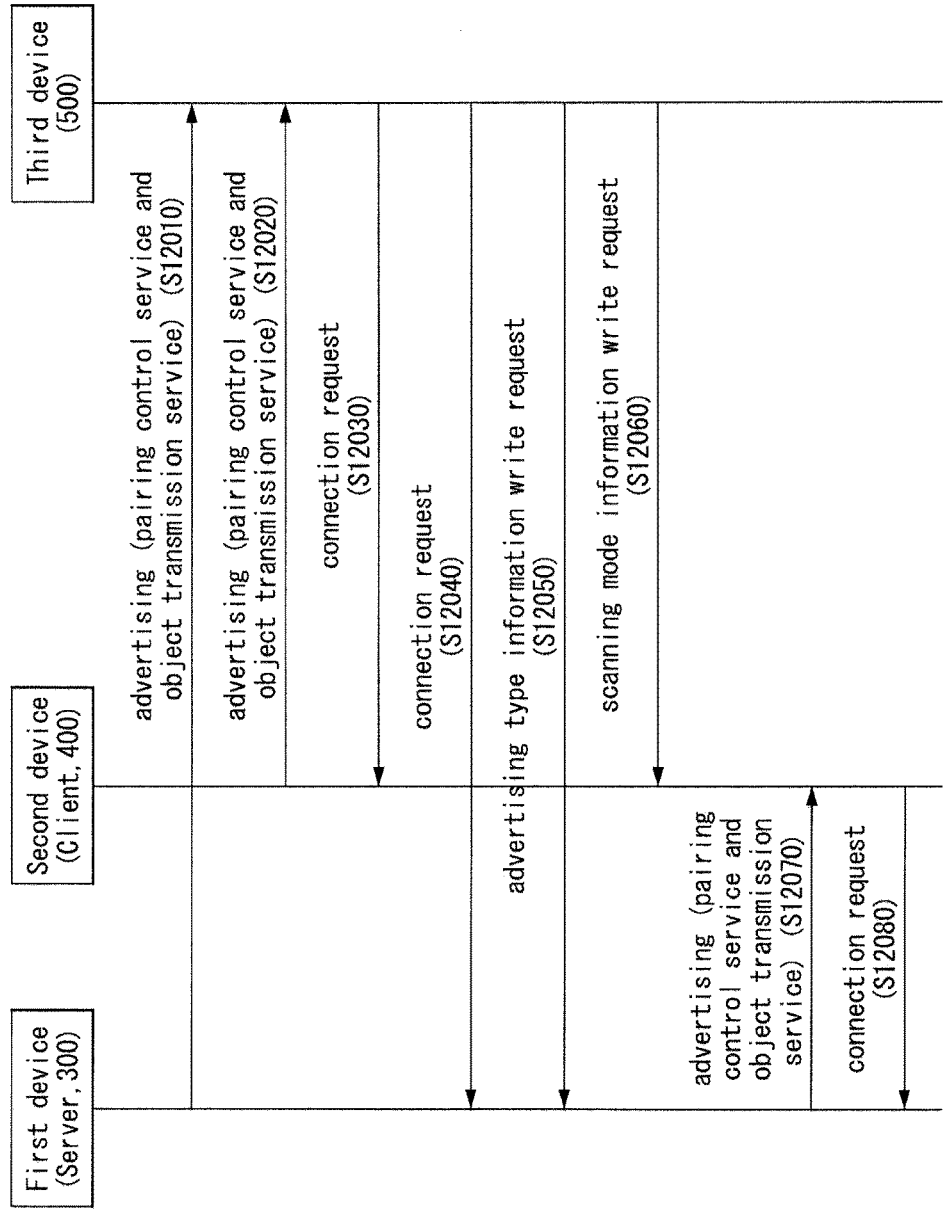
[Fig.12]

[Fig.13]
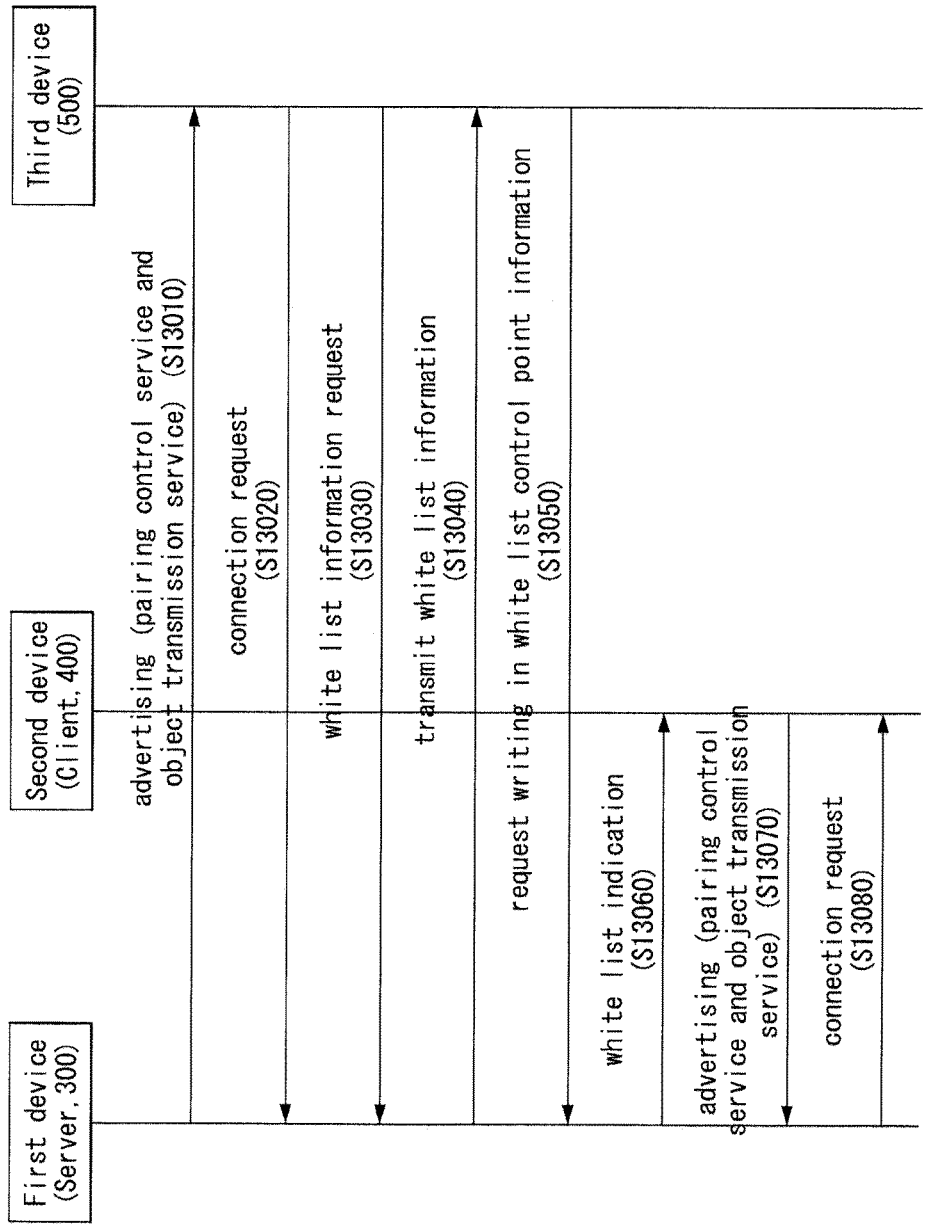

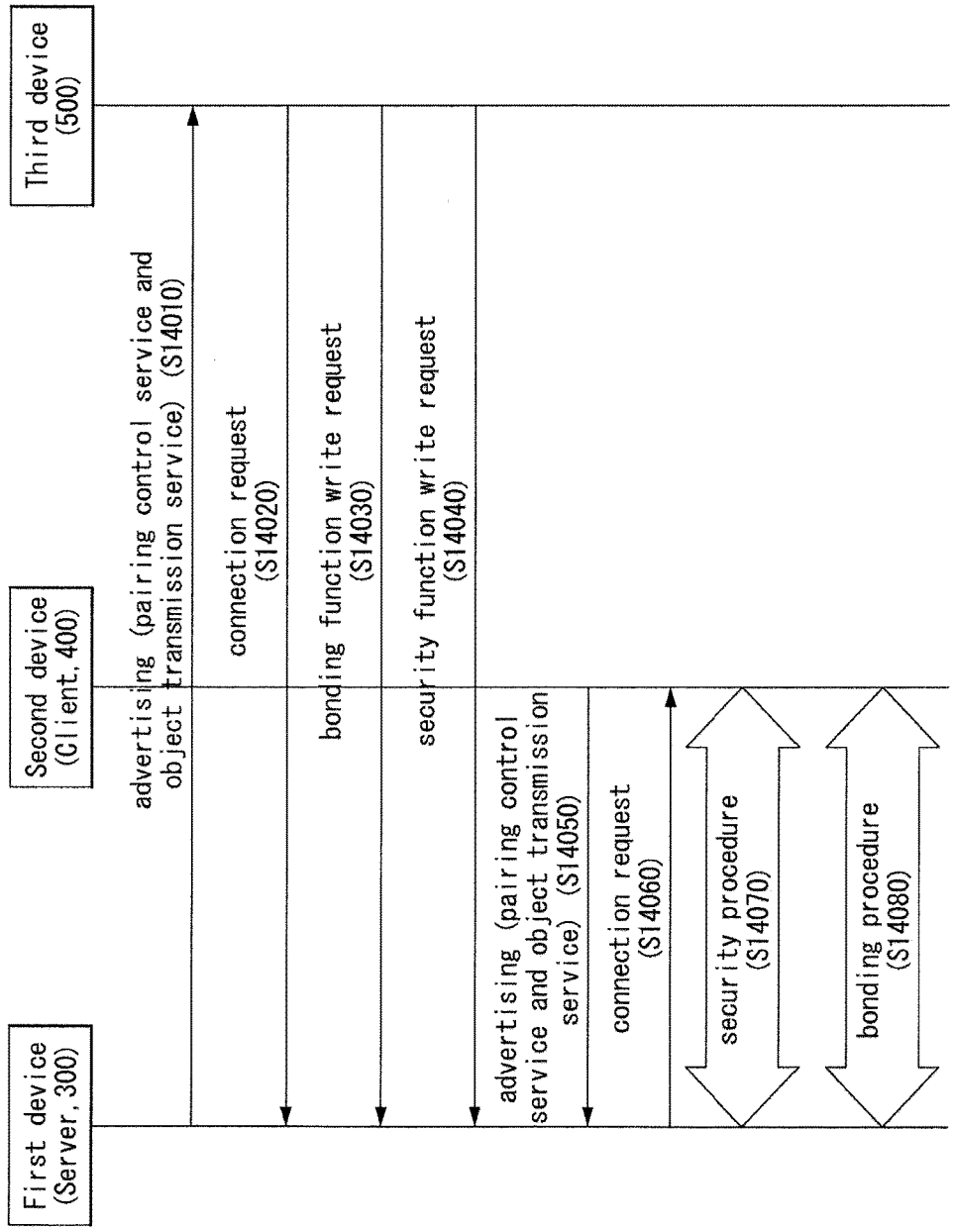
[Fig.14]

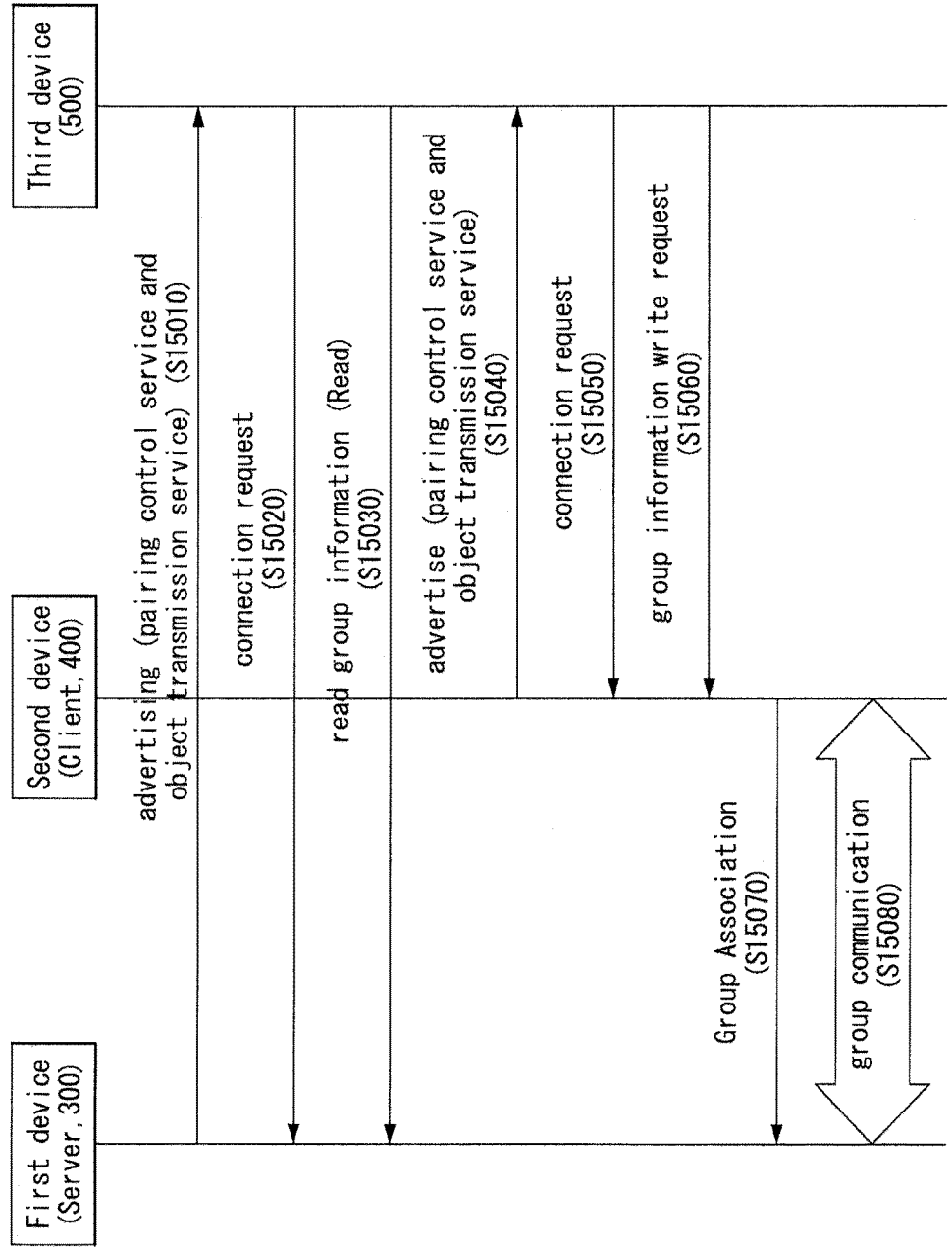

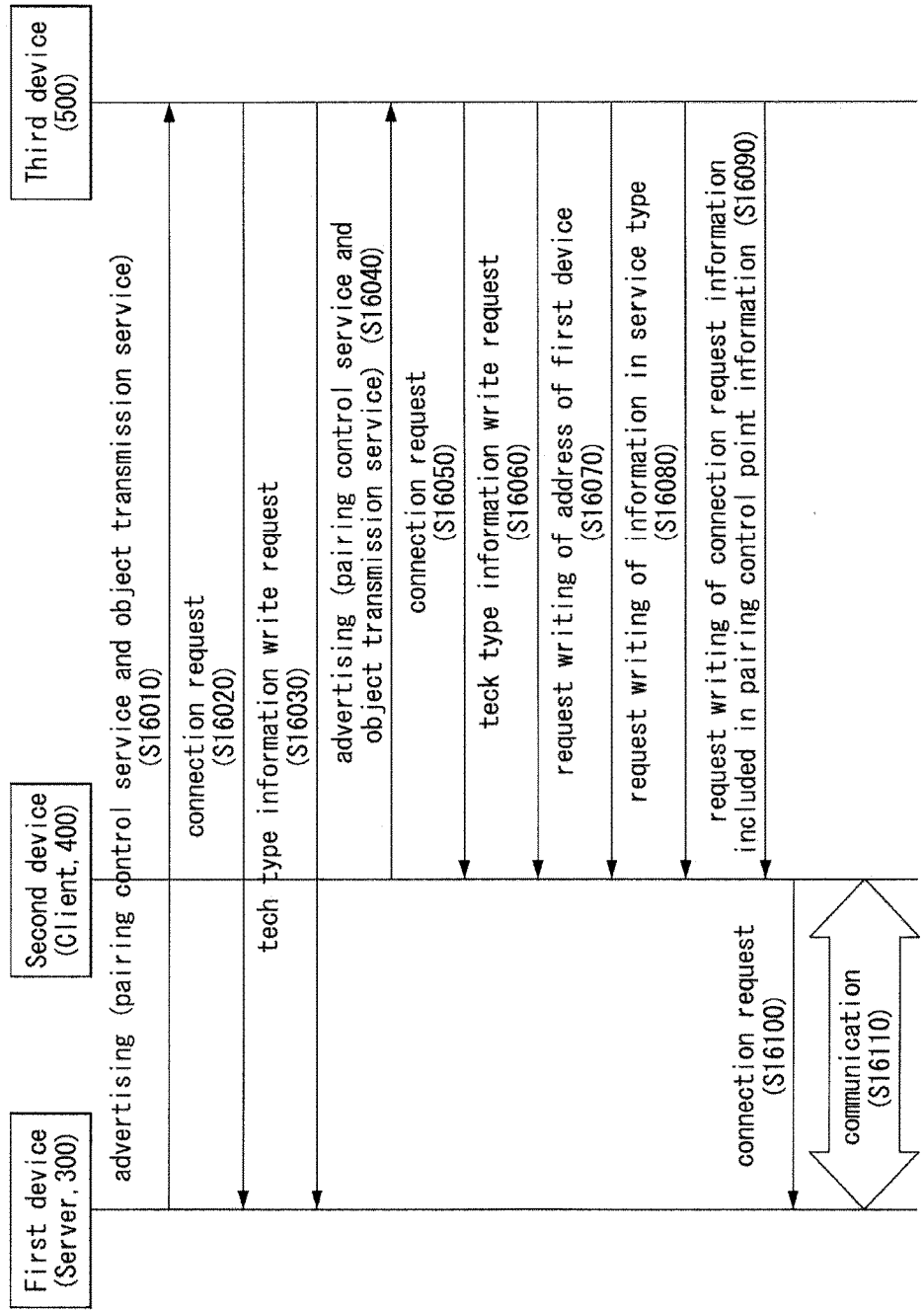

METHOD AND APPARATUS FOR FORMING CONNECTION BETWEEN DEVICES USING BLUETOOTH LOW ENERGY TECHNOLOGY

CROSS-REFERENCE TO RELATED APPLICATIONS

This application is the National Phase of PCT International Application No. PCT/KR2015/006138, filed on Jun. 17, 2015, which claims priority under 35 U.S.C. 119(e) to U.S. Provisional Application No. 62/013,497, filed on Jun. 17, 2014, all of which are hereby expressly incorporated by reference into the present application.

BACKGROUND OF THE INVENTION

Technical Field

The present disclosure relates to a method and apparatus for forming a connection between devices using Bluetooth, a wireless technology standard in a wireless communication system, and more particularly, to a method and apparatus for forming a connection between devices using a Bluetooth low energy (BLE) technology.

Background Art

Bluetooth is an NFC technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the present disclosure, a device may refer to an apparatus or an appliance.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

SUMMARY OF THE INVENTION

An aspect of the present disclosure provides a method for forming a connection between devices using a Bluetooth low energy (BLE) technology.

Another aspect of the present disclosure provides a method for discovering other devices using a BLE technology and controlling formation of a connection between the discovered devices.

Another aspect of the present disclosure provides a method for defining a generic attribute profile (GATT) structure for controlling formation of a connection between other devices using a BLE technology.

Another aspect of the present disclosure provides a method for defining a message for controlling formation of a connection between other devices using a BLE technology.

Another aspect of the present disclosure provides a method for controlling formation of a connection of another device by a control device using a BLE technology.

Technical tasks obtainable from the present invention are non-limited by the above-mentioned technical task. And, other unmentioned technical tasks can be clearly understood from the following description by those having ordinary skill in the technical field to which the present invention pertains.

In an aspect of the present disclosure, there is provided a method for forming a connection between devices using a Bluetooth low energy (BLE) technology.

In detail, the method for forming a connection between a first device and a second device using Bluetooth low energy (BLE) technology includes: receiving an advertising message including information related to a pairing control service from the first device; establishing a Bluetooth connection with the first device based on the advertising message; transmitting a first write request message requesting writing of connection request information indicating transmission of a connection request message to the second device included in pairing control point information through Bluetooth; and receiving a first indication message including connection state information indicating a state of a connection with the second device from the first device, wherein the pairing control point indicates information instructing the first device to perform a specific operation.

Also, in the present disclosure, the method may further include: transmitting a second write request message requesting the first device to write address information of the second device through the Bluetooth LE.

Also, in the present disclosure, the pairing control point information may include at least one of advertising start information indicating start of transmission of an advertising message, advertising stop information indicating stop of transmission of the advertising message, scanning start information indicating start of a scanning procedure, scanning stop information indicating stop of the scanning procedure, connection request information indicating a connection to a peer device, connection stop information indicating stop of the connection to the peer device, refresh bonding information indicating updating of bonding information, or refresh security information indicating re-performing of a security procedure and updating of information.

Also, in the present disclosure, the method may further include: transmitting a second write request message requesting writing of device state information for setting an operational state of the first device; and transmitting a third write request message requesting writing of detailed operation information for setting a detailed operation of the set operational state.

Also, in the present disclosure, the detailed operation may include at least one of duration information indicating a duration time of the operational state, interval information indicating an interval of the operational state, or number information indicating the number of operations according to the operational state.

Also, in the present disclosure, the duration information may include one of a maximum time value indicating a maximum duration time of the operational state and a minimum time value indicating minimum duration time information of the operational state.

Also, in the present disclosure, the method may further include: transmitting a request message requesting white list information indicating information of devices to which the first device is connectable to the first device; receiving a response message including the white list information from the first device; transmitting a second write request message requesting writing of information of the second device in the white list information; and receiving a second indication message including white list information in which information of the second device is written from the first device.

In another aspect of the present disclosure, there is provided a device, as a third device, for establishing a connection between a first device and a second device using a Bluetooth low energy (BLE) technology, including: a communication unit performing communication with external devices in a wireless or wired manner; and a processor functionally connected to the communication unit, wherein the processor receives an advertising message including information related to a pairing control service from the first device, establishes a Bluetooth connection with the first device based on the advertising message, transmits a first write request message requesting writing of connection request information indicating transmission of a connection request message to the second device included in pairing control point information through Bluetooth, and receives a first indication message including connection state information indicating a state of a connection with the second device from the first device, wherein the pairing control point indicates information instructing the first device to perform a specific operation.

Also, in the present disclosure, the processor may controls to transmit a second write request message requesting the first device to write address information of the second device through the Bluetooth LE.

Also, in the present disclosure, the pairing control point information may include at least one of advertising start information indicating start of transmission of an advertising message, advertisement stop information indicating stop of transmission of the advertising message, scanning start information indicating start of a scanning procedure, scanning stop information indicating stop of the scanning procedure, connection request information indicating a connection to a peer device, connection stop information indicating stop of the connection to the peer device, refresh bonding information indicating updating of bonding information, or refresh security information indicating re-performing of a security procedure and updating of information.

Also, in the present disclosure, the processor may controls to transmit a second write request message requesting writing of device state information for setting an operational state of the first device, and transmit a third write request message requesting writing of detailed operation information for setting a detailed operation of the set operational state.

Also, in the present disclosure, the detailed operation may include at least one of duration information indicating a duration time of the operational state, interval information indicating an interval of the operational state, or number information indicating the number of operations according to the operational state.

Also, in the present disclosure, the duration information may include one of a maximum time value indicating a maximum duration time of the operational state and a minimum time value indicating minimum duration time information of the operational state.

Also, in the present disclosure, the processor may controls to transmit a request message requesting white list information indicating information of devices to which the first device is connectable to the first device, receive a response message including the white list information from the first device, transmit a second write request message requesting writing of information of the second device in the white list information, and receive a second indication message including white list information in which information of the second device is written from the first device.

In the method for forming a connection between devices using a Bluetooth low energy (LE) technology according to an embodiment of the present disclosure, formation of a connection between other devices may be controlled through a control device.

Also, according to the present disclosure, a Bluetooth LE connection providing low power consumption and stable connectivity may be formed using the Bluetooth LE technology.

Also, according to the present disclosure, even a device without a user interface (UI) may form an inter-device connection through a control device.

Also, according to the present disclosure, since formation of a connection between other devices is controlled through a single control device, user convenience may be enhanced.

Also, according to the present disclosure, since formation of a connection between other devices is controlled through a single control device, user's confusion due to different UIs of devices may be reduced.

It will be appreciated by persons skilled in the art that that the effects that could be achieved with the present invention are not limited to what has been particularly described hereinabove and other advantages of the present invention will be more clearly understood by a person skilled in the art to which the present invention pertains, from the following detailed description.

BRIEF DESCRIPTION OF THE DRAWINGS

FIG. 1 is a schematic view illustrating an example of a wireless communication system using a Bluetooth low energy (BLE) technology proposed in this disclosure.

FIG. 2 is a view illustrating an example of an internal block diagram of a device capable of implementing methods proposed in this disclosure.

FIG. 3 is a view illustrating an example of BLE topology.

FIG. 4 is a view illustrating an example of Bluetooth communication architecture to which methods proposed in this disclosure is applicable.

FIG. 5 is a view illustrating an example of a structure of generic attribute profile (GATT) of BLE.

FIG. 6 is a flow chart illustrating a method for forming a connection between devices using BLE.

FIGS. 7 to 9 are views illustrating embodiments proposed in this disclosure, in which FIG. 7 illustrates a method for controlling formation of a connection between other devices through a control device and FIGS. 8 and 9 are views illustrating information for controlling other device.

FIG. 10 is a flow chart illustrating an example of a method for providing a pairing control service in a BLE technology proposed in this disclosure.

FIG. 12 is a flow chart illustrating an example of a method for controlling a detailed operation in accordance with status information of other device by a control device when a pairing control service is provided, proposed in this disclosure.

FIG. 13 is a flow chart illustrating an example of a method for updating information of a white list of other device by the control device, proposed in this disclosure.

FIG. 14 is a flow chart illustrating another example of a method for controlling a detailed operation in accordance with status information of other device by a control device when a pairing control service is provided, proposed in this disclosure.

FIG. 15 is a flow chart illustrating a method for belonging to a specific group through group information when a pairing control service is provided, proposed in this disclosure.

FIG. 16 is a flow chart illustrating another example of a method for providing a pairing control service in a BLE technology, proposed in this disclosure.

DETAILED DESCRIPTION OF THE EMBODIMENTS

Figure 11:
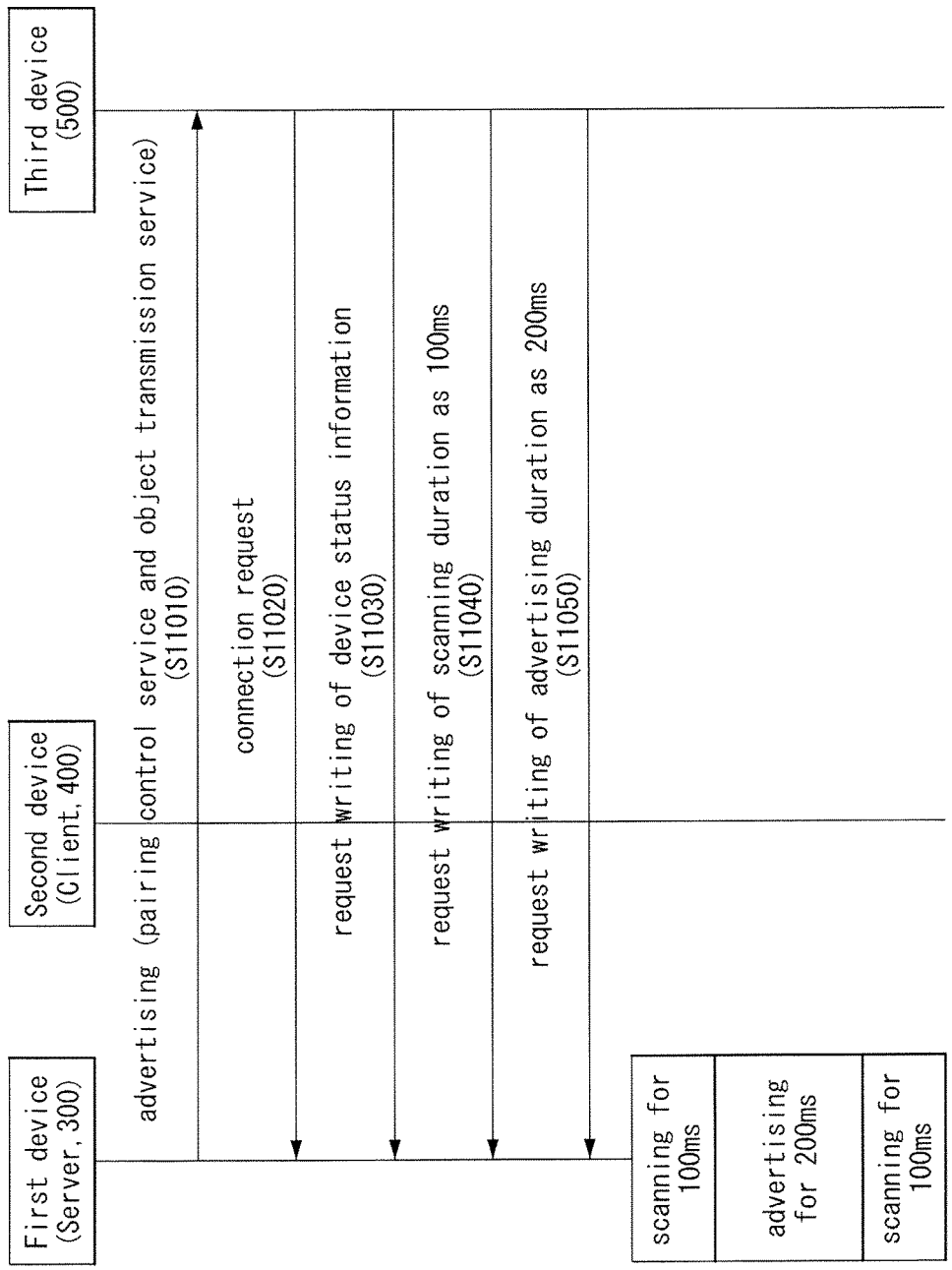
FIG. 11 is a flow chart illustrating another example of a method for providing a pairing control service in a BLE technology proposed in this disclosure.

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

FIG. 1 is a schematic view illustrating an example of a wireless communication system using a Bluetooth low energy (BLE) technology proposed in this disclosure.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called as data service device, slave device, slave, server, conductor, host device, gateway, sensing device, monitoring device, first device, or the like, and the client device 110 may also be called as master device, master, client, member, sensor device, sink device, collector, second device, third device, and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Also, a plurality of devices measuring exercising activities of human beings through a fitness equipment using a specific device have been presented, but a device transmitting measured exercising data through Bluetooth to show specific numerical values to users has not been introduced yet.

Thus, the present invention proposes a method for measuring human beings' exercising activities through the fitness equipment and transmitting and processing measured data through Bluetooth LE to provide the processed data to users.

FIG. 2 is an internal block diagram of an example of devices to which the present invention is applicable.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like. The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules receiving external power or internal power and supplying power required for operations of the respective components under the control of the controllers 114 and 124.

As discussed above, the BLE technology, has a relatively small duty cycle and power consumption may be significantly reduced through a low data rate, and thus, the power supply unit may supply power required for operations of the components even with small output power (10 mW (10 dBm) or less).

The user input interfaces 112 and 122 refer to modules providing a user input such as a screen button to the controllers to enable the user to control an operation of the devices.

FIG. 3 is a view illustrating an example of BLE topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slaves do not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 3, five different device groups are present.

1. Device D is an advertiser and device A is an initiator (group D).
2. Device E is a scanner and Device C is an advertiser (group C).
3. Device H is an advertiser, and devices I and J are scanners (group H).
4. Device K is also an advertiser, and device N is an initiator (group K).
5. Device R is an advertiser, and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device D and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the device O is an initiator. The device O may establish a connection with the device R. Here, the device O may be a slave of two devices and a master of one device at the same time.

FIG. 4 is a view illustrating an example of Bluetooth communication architecture to which methods proposed in this disclosure is applicable.

Referring to FIG. 4, (a) of FIG. 4 illustrates an example of a protocol stack of a Bluetooth basic rate (BR)/enhanced data rate (EDR), and (b) of FIG. 4 illustrates an example of a protocol stack of BLE.

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR baseband layer 14, and a link manager 16.

The BR/EDR PHY layer 12 is a layer transmitting and receiving a 2.4 GHz wireless signal, and in case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence hopping 1400 times per second, and transmits a time slot having a length of 625 us for each channel.

The link manager layer 16 controls a general operation (link setup, control, security) of a Bluetooth connection by utilizing a link manager protocol (LMP).

The link manager layer 16 may perform the following functions.

The link manager layer 16 may perform ACL/SCO logical transport, logical link setup, and control.

Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module 20) includes a logical link control and adaptation protocol (L2CAP, 21), a security manager (SM, 22), an attribute protocol (ATT, 23), a generic attribute profile (GATT, 24), a generic access profile (GAP, 25), and a BR/EDR profile (26).

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The security manager (SM, 22) is a protocol for authenticating a device and providing key distribution.

The generic attribute profile (GATT) 24 may operate as a protocol how the attribute protocol 23 is used in configuring services. For example, the generic attribute profile 24 may operate how ATT attributes are grouped together with services, and operate to describe features associated with services.

Thus, the GATT 24 and the ATT 23 may use features in order to describe status and services of a device and describe how the features are related and used.

The attribute protocol (ATT, 23) and profile (26) define a service (profile) using Bluetooth BR/EDR and define an application protocol for exchanging data thereof, and the generic access profile (GAP, 25) defines a scheme for discovering and connecting a device and providing information to a user, and provides privacy.

As illustrated in (b) of FIG. 4, the Bluetooth LE protocol stack includes a controller stack 30 operable to process a wireless device interface for which timing is important, and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer (LL) 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include a generic access profile (GAP) 40, a logical link control and adaptation protocol (L2CAP) 41, a security manager (SM) 42, an attribute protocol (ATT) 43), a generic attribute profile (GATT) 44, a generic attribute profile (GAP) 45, and an LE profile 46. However, the host stack 40 is not limited thereto and may include various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP (41) may operate to multiplex data between higher layer protocols, segment and reassemble packages, and manage transmission of multicast data.

In BLE, three fixed channels (one for a signaling channel (CH), one for a security manager, and one for an attribute protocol).

Meanwhile, BR/EDR (Basic Rate/Enhanced Data Rate) uses a dynamic channel and supports protocol service multiplexer, retransmission, streaming mode, and the like.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for a client device to request specific information from a server device, and the response message, as a response message with respect to the request message, refers to a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data.
② Include: It defines a relationship between services.
③ Characteristics: It is a data value used in a server.
④ Behavior: It is a format that may be read by a computer defined by a UUID (value type).

The LE profile (46), profiles dependent upon GATT, is mainly applied to a BLE device. The LE profile (46) may include, for example, Battery, Time, FindMe, Proximity, Time, Object Delivery Service, and the like, and details of GATT-based Profiles are as follows.

① Battery: Battery information exchanging method
② Time: Time information exchanging method
③ FindMe: Provision of alarm service according to distance
④ Proximity: Battery information exchanging method
Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

Here, omnidirectional broadcast refers to broadcast in all (every) directions, rather than broadcast in a specific direction.

In contrast, directional broadcast refers to broadcast in a specific direction. Omnidirectional broadcast takes place between an advertising device and a device in a listening state (hereinafter, referred to as a "listening device").

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

In order to request additional user data from the advertising device, the scanning device transmits a scan request to the advertising device. The advertising device transmits a scan response including additional user data requested by the scanning device, as a response to the scan request, through an advertisement physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event.

ADV_DIRECT_IND: Connectable directed advertising event.

ADV_NONCONN_IND: Unconnectable undirected advertising event.

ADV_SCAN_IND: Scannable undirected advertising event.

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state. SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 5 is a view illustrating an example of a structure of generic attribute profile (GATT) of BLE.

Referring to FIG. 5, a structure for exchanging profile data of BLE may be examined.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute

Type: Type of attribute

Value: Value of attribute

Permission: Right to access attribute

The present invention proposes a method in which a sensor measures and stores human activities by using a GATT-based operational structure of the Bluetooth LE, and a client retrieves the stored information from the sensor.

FIG. 6 is a flow chart illustrating a method for forming a connection between devices using BLE.

As illustrated in FIG. 6, in order to establish a Bluetooth LE (BLE) connection between a first device 300 and a second device 400, the first device 300 transmits an advertising message to the second device 400 (S6010).

As discussed above, the advertising message may be used to provide own information (i.e., information of the first device 300) to other device by utilizing BLE, and may include various types of information such as service information, user information, and the like, provided by the device.

Upon checking information included in the advertising message transmitted from the first device 300, the second device 400 transmits a connection request message for requesting a BLE connection to the first device 300 (S6020), whereby the first device 300 and the second device 400 form a BLE connection therebetween (S6030).

This method, however, is advantageous in that, without a user interface (UI) in the first device 300 and/or the second device 400, it is not possible to control formation of a connection therebetween and it is impossible to check a PIN number and control a connection setting.

Thus, in order to solve the problem, the present disclosure proposes a method for forming a connection between the first device 300 and the second device 400 using a third device.

FIGS. 7 to 9 are views illustrating embodiments proposed in this disclosure, in which FIG. 7 illustrates a method for controlling formation of a connection between other devices through a control device and FIGS. 8 and 9 are views illustrating information for controlling other device.

As illustrated in FIG. 7, in order to form a connection between the first device 300 and the second device 400, a third device 500 is required, and in order for the third device 500 to control the first device 300 and the second device 400, a new control protocol is required.

Hereinafter, a control device representing the device controlling formation of a connection between the first device 300 and the second device 400 will be referred to as a third device 500.

The third device 500 controls a connection state of other devices (for example, Bluetooth devices) without using an actual service or profile.

Here, in order to control a connection state of other devices, the third device 500 should know information (e.g., interface information, service information, and the like) of other devices.

Table 2 below shows an example of characteristics included in the GATT for controlling a device.

TABLE 2

| Characteristic Name | Requirement | Mandatory Propertied |
|---|---|---|
| Peer Device | M | Read, Write, Indication |
| Group Info | O | Read, Write, Indication |
| Device State | M | Read, Write, Indication |
| Advertising Duration | O | Read, Write, |
| Scanning Duration | O | Read, Write, |
| Standby Duration | O | Read, Write, |
| Initiating Duration | O | Read, Write, |
| Connection Duration | O | Read, Write, |
| Advertising Type | O | Read, Write, |
| Scanning Type | O | Read, Write, |
| Supported Scanning | O | Read, Write, |
| Pairing Control Point | M | Write, Indication |
| Connection Status | O | Read, Indication |
| WhiteList | O | Read, Write, Indication |
| WhiteList Control Point | O | Read, Write, Indication |
| Bondable | O | Read, Write, |
| Security | O | Read, Write, |

TABLE 2-continued

| Characteristic Name | Requirement | Mandatory Propertied |
|---|---|---|
| Connected Tech Type | O | Read, Write, |
| Service Type | O | Read, Write, |

Descriptions of the characteristics included in Table 2 are as follows.

Peer Device: It uses an address value of a counterpart device to be paired, a name of the device, and the like. By setting this value, the address of the paired device may be provided.

Group Info: It uses a name or an address of a group to which a corresponding device belongs. Names or addresses of several groups may be used, and whether the corresponding device is a group owner or a member may be identified.

Device State: It refers to scanning, standby, advertising, Initiating, and connection state corresponding to a link layer state of a controlled device, and may designate one state or several states. It is possible to request performing a corresponding state function through writing, and a current state of the controlled device may be recognized through reading. A changed in a state of the controlled device may be recognized through indication.

Advertising Duration: It is a period when a controlled device operates in an advertising state, and this value is meaningless when the controlled device is in other state.

Scanning Duration: It is a period when a controlled device operates in a scanning state, and this value is meaningless when the controlled device is in other state.

Standby Duration: It is a period when a controlled device operates in a standby state, and this value is meaningless when the controlled device is in other state.

Initiating Duration: It is a period when a controlled device operates in an initiating state, and this value is meaningless when the controlled device is in other state.

Connection Duration: It is a period when a controlled device operates in a connection state, and this value is meaningless when the controlled device is in other state.

Advertising Type: It may define a method for a specific advertising operation when an advertising operation is requested to a controlled device.

Scanning Type: It may define a method for a specific advertising operation when a scanning operation is requested to a controlled device.

Pairing Control Point: It may perform a control point function indicating which action is to be executed by a controlled device.

Connection State: It represents characteristics for a controlled device to provide connection information to a controller.

WhiteList: It includes information of devices to which a controlled device is connectable, and may be extended to be connectable to several devices if necessary.

WhiteList Control Point: It represents a control function for managing a white list (WhiteList) managed by a controlled device.

Bondable: It may indicate whether a controlled device provides a bonding function.

Security: It indicates whether authentication, authorization, encryption, data signing functions are provided.

Connected Tech Type & Service Type: It indicates a communication scheme technology desired to be connected (for example, WiFi, Ethernet, BR/EDR, BLE, etc) and a connected service type.

Table 3 shows an example of peer device information type of Table 2.

TABLE 3

| Data Type | Type | Description |
| --- | --- | --- |
| Bluetooth Address | 48 bits integer | Public device address or/and random device address |
| Bluetooth Device Name | String | Controlled Device friendly Name that is set by the device user |

Table 4 shows an example of device state information type of Table 2.

TABLE 4

| Data Type | Type | Description |
| --- | --- | --- |
| Current Device State | 8 bits Integer | Current Device State in which the device is operated now |
| Operated Device States | 8 bits integer | Operated Device States among which the device can be operated among |

Current Device State: It indicates a state of a device currently in operation, and only one device may be selected.

Operated Device States: It indicates a state of a currently operable device, and several devices may be selected.

Table 5 shows an example of a device state format.

TABLE 5

| 7th bit | 6th bit | 5th bit | 4th bit | 3rd bit | 2nd bit | 1st bit | 0th bit |
| --- | --- | --- | --- | --- | --- | --- | --- |
| Mode | | | Connecting | Initiating | Advertising | Standby | Scanning |

When the mode value is 1, it indicates a current device state and may enable only one value.

When the mode value is 0, it indicates operated device states and may enable a plurality of values.

Table 6 shows an example of duration information according to each state.

TABLE 6

| Characteristic | Type | Description |
| --- | --- | --- |
| Scanning Duration | 32 bits integer | Operation Duration for Scanning State |
| Standby Duration | 32 bits integer | Operation Duration for Standby |
| Advertising Duration | 32 bits integer | Operation Duration for Advertising State |
| Initiating Duration | 32 bits integer | Operation Duration for Initiating State |

TABLE 6-continued

| Characteristic | Type | Description |
| --- | --- | --- |
| Connecting Duration | 32 bits integer | Operation Duration for Connecting State |

Table 7 shows an example of the duration value.

TABLE 7

| 31th bit | 30th bit | 29th~0th |
| --- | --- | --- |
| Mode | | Time value |

Here, when the mode value is "01", it indicates a minimum speed value, and when the mode value is "10", it indicates a maximum speed value.

Table 8 shows an example of a data format of the Advertising Type of Table 2.

TABLE 8

| 15th bit | 14th bit | | 2nd bit | 1st bit | 0th bit |
| --- | --- | --- | --- | --- | --- |
| PDU Type | | Reserved For Future Use | Appearance | Profile Info | Device Name |

When the PDU type value of "00", an advertising message of ADV_IND type may be transmitted, and when the PDU Type value is "01", an advertising message of ADV_DIRECT_IND type may be transmitted.

When the PDU type value is "10", it indicates transmission of an advertising message of ADV_NONCONN_IND type, and when the PDU type value of "11", it indicates transmission of an advertising message of ADV_SCAN-IND type.

The profile information indicates profile information provided in a device.

Table 9 shows an example of a data format of the pairing control point of Table 2.

TABLE 9

| 0x01 | 0x02 | 0x03 | 0x04 | 0x05 | 0x06 | 0x07 | 0x08 | 0x09 |
| --- | --- | --- | --- | --- | --- | --- | --- | --- |
| Execute | Advertising Stat | Advertising Stop | Scanning Start | Scanning Stop | Connection Request | Connection Stop | Refresh Bonding | Refresh Security |

Execute: It provides states defined in Device States.
(It can provide a plurality of state functions).

Advertising Start: When an advertising operation is not performed, it starts the corresponding operation.
(Immediately start the corresponding function and/or when the corresponding state is deactivated, it can be activated).

Advertising Stop: When advertising operation is performed, the corresponding operation is terminated.
(Immediately stop the corresponding function and/or when the corresponding state is activated in Device States, it can be deactivated).

Scanning Start: When scanning is not performed, the corresponding operation is started).
(Immediately start the corresponding function and/or when the corresponding state is deactivated in Device States, it can be activated).
Scanning Stop: When advertising is performed, the corresponding operation is terminated.
(Immediately stop the corresponding function and/or when the corresponding state is activated in Device States, it can be deactivated).
Connecting Request: it sets a connection with a peer device.
Connection Stop: It terminates a connection with a peer device.
Refresh Bonding: It newly updates bonding information (or bonding information may be deleted).
Refresh Security: It re-performs a security procedure (authentication, authorization, encryption) between two devices and update information (key value of each security procedure).

FIG. 8 is a view illustrating an example of information of Connection Status of Table 2, as information for controlling a device.

TABLE 11

| 7th bit | 6th bit | 5th bit | 4th bit | 3rd bit | 2nd bit | 1st bit | 0th bit |
|---|---|---|---|---|---|---|---|
| Reserved for Future Use | | Security Level(1-3) | | Reserved for Future Use | | Security Mode 1 or 2 | |

Tables 12 and 13 show examples of connected Tech Type of Table 2.

TABLE 12

| 0x01 | 0x02 | 0x03 | 0x04 | 0x05 | 0x06 | 0x07~ |
|---|---|---|---|---|---|---|
| BLE | BR/EDR | WiFi | WiFi Display | WiGig | Ethernet | |

TABLE 13

| 7th bit | 6th bit | 5th bit | 4th bit | 3rd bit | 2nd bit | 1st bit | 0th bit |
|---|---|---|---|---|---|---|---|
| RFU | | Ethernet | WiGig | WiFi Display | WiFi | BR/EDR | BLE |

The Connection Status Indication of FIG. 8 may provide connection status information of a controlled device as follows.

It simply provides whether connected.

It provides whether connected and information of a connected device (also provides an address or a friendly name of a peer device).

It provides various states (initiating, advertising, scanning) including connection.

It provides information of a peer device together in an initiated state.

It can also provide detailed information (advertising/scanning method and operation mode) together in an advertising and scanning state.

It can also provide information related to a connection such as Connected Tech Type, Service Type, Security, Group Info together, if necessary.

FIG. 9 is a view illustrating an example of Group Info of Table 2, as information controlling a device.

Table 10 shows an example of group security level case 1, and Table 11 shows an example of a group security level case 2.

TABLE 10

| 0x01 | 0x02 | 0x03 | 0x04 | 0x05 | 0x06 | 0x07~ |
|---|---|---|---|---|---|---|
| Security Mode 1 & Level 1 | Security Mode 1 & Level 2 | Security Mode 1 & Level 3 | Security Mode 2 & Level 1 | Security Mode 2 & Level 2 | Security Mode 2 & Level 3 | |

The data format and information of the characteristics discussed above with reference to FIGS. 7 to 9 may be used in all the embodiments of the present disclosure.

FIG. 10 is a flow chart illustrating an example of a method for providing a pairing control service in a BLE technology proposed in this disclosure.

A pairing control service refers to a service supported in BLE in order to control a connection of other devices through a control device. Hereinafter, the control device will be referred to as a third device 500.

First, the first device 300 transmits an advertising message to the third device 500 in order to provide information related to the first device 300 by including a pairing control service (S10010).

The advertising message may be expressed by an advertisement pack data unit (PDU), an advertisement packet, an advertisement, an advertisement frame, an advertisement physical channel PDU, and the like.

The advertising message may include service information (including a service name) provided by the first device 300, a name of the first device 300, manufacturer data, information regarding a role of the first device 300, i.e., information indicating that the first device 300 serves as a server, and the like.

Also, the advertising message may be transmitted to the third device 500 in a broadcast manner or unicast manner.

Thereafter, the second device 400 may also transmit an advertising message to the third device 500 (S10020).

The advertising message transmitted by the second device 400 may include service information (including a service name) provided by the second device 400, a name of the second device 400, manufacturer data, information regarding a role of the second device 400, i.e., information indicating that the second device 400 serves as a client, and the like.

In order to form a BLE connection with the second device 400, the third device 500 may transmit a connection request message to the second device 400 on the basis of the information included in the received advertising messages (S10030).

Thereafter, in a state in which a connection is formed with the second device 400 through BLE, the third device 500 may request the second device 400 to write an address of the first device 300 to set peer device information discussed above in Table 2 to an address of the first device 300 (S10040).

The second device 400 may obtain information of the first device 300 through the peer device information set by the address of the first device 300.

The third device 500 may request the second device 400 to write connection request information indicating formation of a connection with the first device 300 included in pairing control point information indicating a specific operation (S10050).

Thereafter, when the second device 400 transmits a connection request message to the first device 300 (S10060), the first device 300 and the second device 400 are connected (S10070).

After formation of the connection, the second device 400 may transmit connection state information indicating a connection state of the second device 400 through a connection state indication message to the third device 500 (S10060).

In order to receive such an indication message, bonding information should be managed and a continuous connection state should be maintained between the second device 400 and the third device 500.

FIG. 11 is a flow chart illustrating another example of a method for providing a pairing control service in a BLE technology proposed in this disclosure.

As illustrated in FIG. 11, the first device 300 transmits an advertising message to the third device 500 in order to provide information related to the first device 300 by including a pairing control service (S11010).

The advertising message may be expressed by an advertisement pack data unit (PDU), an advertisement packet, an advertisement, an advertisement frame, an advertisement physical channel PDU, and the like.

The advertising message may include service information (including a service name) provided by the first device 300, a name of the first device 300, manufacturer data, information regarding a role of the first device 300, i.e., information indicating that the first device serves as a server, and the like.

Also, the advertising message may be transmitted to the third device 500 in a broadcast manner or unicast manner.

Thereafter, in order to form a BLE connection with the first device 300, the third device 500 may transmit a connection request message to the first device 300 (S11020).

In a state in which the BLE connection is established through the connection request message, the third device 500 requests the first device 300 to write device state information of Table 2 in order to set an operation state indicating an operation of the first device 300 (S11030).

Here, when the third device 500 changes $0^{th}$ and $2^{nd}$ bit of Table 4 to 1, the first device 300 may maintain a scanning state and an advertising state.

In order to set a scanning time of the first device 300, the third device 500 may request the first device 300 to write scanning duration information to 100 ms (S11040).

Thereafter, in order to set an advertisement time of the first device 300, the third device 500 may request the first device 300 to write Advertising Duration information to 200 ms (S11050).

The first device 300 may perform scanning and advertising in the set state and duration.

In the aforementioned embodiment, the scanning duration and the advertising duration are an example and may be set to be different. For example, the scanning duration may be changed to scan interval (ScanInterval), scan window (ScanWindow), Scan number, and the like, and the advertising duration may be changed to an advertising interval (AdvertInterval), an advertising window (AdvertisingWindow), an advertising number, and the like.

FIG. 12 is a flow chart illustrating an example of a method for controlling a detailed operation in accordance with status information of other device by a control device when a pairing control service is provided, proposed in this disclosure.

Referring to FIG. 12, different types of message may be transmitted according to a setting of a control device.

First, steps S12010 to S12030 are the same as steps S10010 to S10030, and thus, descriptions thereof will be omitted.

Thereafter, the third device 500 transmits a connection request message for forming a BLE connection to the first device 300 (S12030) to form a BLE connection.

The third device 500 transmits an advertising type information write request for setting an advertisement type to the first device 300 through BLE (S12040), and requests the second device 400 to write scanning mode information for setting a scanning mode (S12050).

Thereafter, the first device 300 may transmit an advertising message corresponding to the advertisement type set by the third device 500 to the second device 400, and since the scanning mode is an active mode by the third device 500, the second device 400 may transmit a connection request message for forming a connection to the first device 300 (S12070).

The first device 300 and the second device 400 may form a connection on the basis of the connection request message.

FIG. 13 is a flow chart illustrating an example of a method for updating information of a white list of other device by the control device, proposed in this disclosure.

First, step S13010 and step S13020 are the same as step S11010 and S11020 of FIG. 11, and thus, descriptions thereof will be omitted.

After forming a BLE connection with the first device 300, the third device 500 may request white list information from the first device 300 through the BLE (S13030).

The white list information represents information of a device to which the first device 300 may be connected.

In response to the request, the first device 300 may receive a response message including the white list information from the third device 500 (S13040).

If information of the second device 400 is not included in the white list, in order to include information of the second device 400 in the white list information, the third device 500 may request the first device 300 to write in white list control point information to thereby perform an ADD function (S13050).

Thereafter, when the information of the second device 400 is included in the white list, the first device 300 may transmit an indication message (indication information) indicating that the white list has been changed to the second device 400.

The second device 400 may transmit an advertising message to the first device 300 (S13070), and the first device 300 may transmit a connection request message to the second device 400 on the basis of the advertising message (S13080) to form a connection with the second device 400.

In another embodiment of the present disclosure, adding device information to a black list, instead of the white list, or deleting device information therefrom may be requested. The black list may include information of devices to which the device does not want to be connected.

FIG. 14 is a flow chart illustrating another example of a method for controlling a detailed operation in accordance with status information of other device by a control device when a pairing control service is provided, proposed in this disclosure.

Referring to FIG. 14, the third device 500 may request writing of a bonding function and a security function to cause a security procedure and a bonding procedure to be performed between the first device 300 and the second device 400.

First, steps S14010 and S14020 are the same as steps S11010 and S11020 of FIG. 11, and thus, descriptions thereof will be omitted.

After the third device 500 is connected with the first device 300 through BLE, the third device 500 may transmit a bonding function write request message to the first device 300 in order to activate a bonding function regarding a device connected to the first device 300 (S14030).

The bonding function is Bondable information of Table 2, and when the Bondable information is "0", it indicates deactivation of the bonding function, and when the Bondable information is "1", it indicates activation of the bonding function.

When the bonding function is activated, connected devices may maintain bonding information to easily execute re-connection, and when the bonding function is deactivated, bonding information is not managed.

Thereafter, in order to activate a security function regarding a device connected to the first device 300, the third device 500 may transmit a security function write request message to the first device 300 (S14040).

The security function is the Security information of Table 2, and when the Security information is "0", it indicates deactivation of the security function, and when the Security information is "1", it indicates activation of the security function.

Here, the security function (e.g., authentication, authorization, encryption, or privacy, etc.) may be executed according to a set security mode.

The second device 400 may transmit an advertising message to the first device 300 (S14050), and the first device 300 may transmit a connection request message requesting a BLE connection to the second device 400 on the basis of the advertising message (S14060).

Thereafter, the first device 300 and the second device 400 may perform a security procedure according to the set security mode (S14070), and may perform a bonding procedure according to a set bondable information value (S14080).

FIG. 15 is a flow chart illustrating a method for belonging to a specific group through group information when a pairing control service is provided, proposed in this disclosure.

Referring to FIG. 15, the control device may obtain information of a group ID and a group owner from a device and transmit the group ID and the group owner information to a device not belonging to the group to control the device to be included in the group.

In detail, the first device 300 may transmit an advertising message to the third device 500 (S15010).

The advertising message may be expressed by an advertisement pack data unit (PDU), an advertisement packet, an advertisement, an advertisement frame, an advertisement physical channel PDU, and the like.

The advertising message may include service information (including a service name) provided by the first device 300, a name of the first device 300, manufacturer data, information regarding a role of the first device 300, i.e., information indicating that the first device 300 serves as an owner, and the like.

Also, the advertising message may be transmitted to the third device 500 in a broadcast manner or unicast manner.

The third device 500 may transmit a connection request message requesting a BLE connection with the first device 300 to the first device 300 on the basis of the advertising message (S15020).

The first device 300 and the third device 500 may form a BLE connection on the basis of the connection request message, and the third device 500 may read Group Info information of Table 2 from the first device 300 to obtain the group ID and the group owner information (S15030).

The second device 400 may transmit an advertising message including information supporting a group service and it is able to operate as a group member to the third device 500 (S15040).

In order to form a BLE connection on the basis of the advertising message, the third device 500 transmits a connection request message to the second device 400 (S15050) to form a BLE connection with the second device 400.

Here, even when the second device 400 supports only a specific service, as well as serving as a client as a group member, the second device 400 may be connected to the third device 500.

Thereafter, the third device 500 may transmit the group information (group ID and group owner information) obtained from the first device 300 to the second device 400 to request writing of group information (S15060).

Here, if necessary, a security key value may also be provided.

The first device 300 and the second device 400 may generate association on the basis of the group information and exchange authentication and a security key, or the like, to perform a security procedure (S15070).

Thereafter, the first device 300 and the second device 400 may perform group communication, as communication between or among devices belonging to a specific group through multicasting or packet relaying (S15080).

Steps S15040 to S15060 of the this embodiment may be repeatedly executed for several devices, and in this case, several devices may be perform group communication.

FIG. 16 is a flow chart illustrating another example of a method for providing a pairing control service in a BLE technology, proposed in this disclosure.

Referring to FIG. 16, a control device may cause devices to form a connection by selecting a specific communication scheme technology through BLE.

First, steps S16010 and S16020 are the same as steps S11010 and S11020 of FIG. 11, so descriptions thereof will be omitted.

The third device 500 may select a communication scheme technology desired for the first device 300 to perform communication and request writing it to the Tech Type information of Table 2 (S16030).

Thereafter, the second device 400 may transmit an advertising message including a pairing control service and an object transmission service information, as service information thereof, to the third device 500 (S16040).

Here, the second device 400 may include a communication scheme technology that the second device 400 is supportable, in the advertising message and transmit the same.

In order to form a BLE connection with the second device 400 on the basis of the advertising message, the third device 500 may transmit a connection request message to the second device 400 (S16050).

The third device 500 may select a communication scheme technology via which the second device 400 wants to perform communication through the BLE, and request writing of it in the Tech Type information (S16060).

The third device 500 may request writing Peer Device information of Table 2 to the information of the first device 300 to provide information of the first device 300 (S16070).

Thereafter, that a service desired to be connected to the second device 400 is an object transmission service is explicitly designated and requested to be written in the Service Type of Table 2 (S16080).

The third device 500 requests the second device 400 to write connection request information indicating formation of a connection with the first device 300 included in the pairing control point information indicating a specific operation (S16090).

Thereafter, the second device 400 transmits a connection request message to the first device 300 (S16100), and the first device 300 and the second device 400 are connected (S16110).

Through this method, the first device 300 and the second device 400 may be connected using a specific communication scheme technology through the third device 500.

The above-described present invention is not limited to the above-described embodiments and the accompanying drawings because those having ordinary skill in the technical field to which the present invention pertains can make various replacements, variations and modifications within the range which does not depart from the technical spirit of the invention.

The invention claimed is:

1. A method for forming a connection between a first device and a second device using Bluetooth low energy (BLE), by a third device, the method comprising:
   receiving an advertising message including information related to a pairing control service from the first device;
   establishing a Bluetooth connection with the first device based on the advertising message;
   transmitting a first write request message requesting writing of connection request information indicating transmission of a connection request message to the second device included in pairing control point information through Bluetooth; and
   receiving a first indication message including connection state information indicating a state of a connection with the second device from the first device,
   wherein the pairing control point information includes information instructing the first device to perform a specific operation.

2. The method of claim 1, further comprising:
   transmitting a second write request message requesting the first device to write address information of the second device through the BLE.

3. The method of claim 1, wherein the pairing control point information includes at least one of advertising start information indicating start of transmission of an advertising message, advertising stop information indicating stop of transmission of the advertising message, scanning start information indicating start of a scanning procedure, scanning stop information indicating stop of the scanning procedure, connection request information indicating a connection to a peer device, connection stop information indicating stop of the connection to the peer device, refresh bonding information indicating updating of bonding information, or refresh security information indicating re-performing of a security procedure and updating of information.

4. The method of claim 1, further comprising:
   transmitting a second write request message requesting writing of device state information for setting an operational state of the first device; and
   transmitting a third write request message requesting writing of detailed operation information for setting a detailed operation of the set operational state.

5. The method of claim 4, wherein the detailed operation includes at least one of duration information indicating a duration time of the operational state, interval information indicating an interval of the operational state, or number information indicating the number of operations according to the operational state.

6. The method of claim 5, wherein the duration information includes one of a maximum time value indicating a maximum duration time of the operational state and a minimum time value indicating minimum duration time information of the operational state.

7. The method of claim 1, further comprising:
   transmitting a request message requesting white list information indicating information of devices to which the first device is connectable to the first device;
   receiving a response message including the white list information from the first device;
   transmitting a second write request message requesting writing of information of the second device in the white list information; and
   receiving a second indication message including white list information in which information of the second device is written from the first device.

8. A device, as a third device, for forming a connection between a first device and a second device using Bluetooth low energy (BLE), the device comprising:
   a communication unit performing communication with external devices in a wireless or wired manner; and
   a processor functionally connected to the communication unit,
   wherein the processor
   receives an advertising message including information related to a pairing control service from the first device,
   establishes a Bluetooth connection with the first device based on the advertising message,
   transmits a first write request message requesting writing of connection request information indicating transmission of a connection request message to the second device included in pairing control point information through Bluetooth, and
   receives a first indication message including connection state information indicating a state of a connection with the second device from the first device, wherein the pairing control point information includes information instructing the first device to perform a specific operation.

9. The device of claim 8, wherein the processor controls to transmit a second write request message requesting the first device to write address information of the second device through the BLE.

10. The device of claim 8, wherein the pairing control point information includes at least one of advertising start information indicating start of transmission of an advertising message, advertisement stop information indicating stop of transmission of the advertising message, scanning start information indicating start of a scanning procedure, scanning stop information indicating stop of the scanning procedure, connection request information indicating a connection to a peer device, connection stop information indicating stop of the connection to the peer device, refresh bonding information indicating updating of bonding information, or refresh security information indicating re-performing of a security procedure and updating of information.

11. The device of claim 8, wherein the processor controls to transmit a second write request message requesting writing of device state information for setting an operational state of the first device, and transmit a third write request message requesting writing of detailed operation information for setting a detailed operation of the set operational state.

12. The device of claim 11, wherein the detailed operation includes at least one of duration information indicating a duration time of the operational state, interval information indicating an interval of the operational state, or number information indicating the number of operations according to the operational state.

13. The device of claim 12, wherein the duration information includes one of a maximum time value indicating a maximum duration time of the operational state and a minimum time value indicating minimum duration time information of the operational state.

14. The device of claim 8, wherein the processor controls to transmit a request message requesting white list information indicating information of devices to which the first device is connectable to the first device, receive a response message including the white list information from the first device, transmit a second write request message requesting writing of information of the second device in the white list information, and receive a second indication message including white list information in which information of the second device is written from the first device.

* * * * *